United States Patent
Bostick et al.

(10) Patent No.: US 9,668,012 B2
(45) Date of Patent: *May 30, 2017

(54) EVENT POP-UPS FOR VIDEO SELECTION

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,579

(22) Filed: Sep. 8, 2016

(65) Prior Publication Data

US 2017/0070769 A1    Mar. 9, 2017

Related U.S. Application Data

(63) Continuation of application No. 15/080,788, filed on Mar. 25, 2016, now Pat. No. 9,473,819, which is a
(Continued)

(51) Int. Cl.
*H04N 21/472* (2011.01)
*H04N 21/45* (2011.01)
(Continued)

(52) U.S. Cl.
CPC ... *H04N 21/4312* (2013.01); *H04N 21/44222* (2013.01); *H04N 21/4532* (2013.01);
(Continued)

(58) Field of Classification Search
CPC combination set(s) only.
See application file for complete search history.

(56) References Cited

U.S. PATENT DOCUMENTS

| 5,822,123 A | 10/1998 | Davis et al. |
| 8,510,778 B2 | 8/2013 | Craner et al. |

(Continued)

FOREIGN PATENT DOCUMENTS

WO    0195223 A2    12/2001

OTHER PUBLICATIONS

Betters, Elyse; "Google Chromecast tips: Ten ways to enhance your streaming experience"; Pocket-lint; Jul. 5, 2014;© Pocket-lint ltd, 2003-2015; pp. 1-7; <http://www.pocket-lint.com/news/129736-google-chromecast-tips-ten-ways-to-enhance-your-streaming-experience>.
(Continued)

*Primary Examiner* — Nasser Goodarzi
*Assistant Examiner* — Fred Peng
(74) *Attorney, Agent, or Firm* — Isaac J. Gooshaw

(57) ABSTRACT

A computer program product for notifying a viewer of content relevant to the viewer's interests is provided. A computer identifies an identity of a viewer of a display device, wherein the display device is displaying a first video feed. A computer determines a plurality of preferences of the viewer. A computer retrieves a profile of the viewer, wherein the profile includes the plurality of preferences of the viewer. In response to a determination that a content of a second video feed that is available for viewing on the display device matches at least one of the plurality of preferences of the viewer, a computer generates a notification of the second video feed. In response to receiving an acceptance of the notification, a computer sends a command to the display device to display the second video feed.

1 Claim, 6 Drawing Sheets

Related U.S. Application Data continuation of application No. 14/845,479, filed on Sep. 4, 2015.

(51) Int. Cl.

| | |
|---|---|
| *H04N 21/466* | (2011.01) |
| *H04N 21/25* | (2011.01) |
| *G06K 9/00* | (2006.01) |
| *H04N 21/431* | (2011.01) |
| *H04N 21/442* | (2011.01) |
| *H04N 21/4788* | (2011.01) |
| *H04N 21/4782* | (2011.01) |
| *H04N 21/482* | (2011.01) |
| *H04N 21/81* | (2011.01) |
| *H04L 29/08* | (2006.01) |

(52) U.S. Cl.
CPC ..... *H04N 21/4668* (2013.01); *H04N 21/4782* (2013.01); *H04N 21/4788* (2013.01); *H04N 21/482* (2013.01); *H04N 21/8133* (2013.01); *H04L 67/22* (2013.01); *H04L 67/306* (2013.01)

(56) References Cited

U.S. PATENT DOCUMENTS

| | | | |
|---|---|---|---|
| 8,745,666 B1 | 6/2014 | Zaveri | |
| 9,247,300 B2 | 1/2016 | Oddo et al. | |
| 9,473,819 B1* | 10/2016 | Bostick | H04N 21/47214 |
| 9,510,051 B1 | 11/2016 | Bostick et al. | |
| 2001/0049826 A1 | 12/2001 | Wilf | |
| 2002/0157101 A1 | 10/2002 | Schrader et al. | |
| 2003/0023977 A1 | 1/2003 | Brown et al. | |
| 2003/0163817 A1 | 8/2003 | Han | |
| 2004/0003395 A1 | 1/2004 | Srinivas et al. | |
| 2004/0148636 A1 | 7/2004 | Weinstein et al. | |
| 2006/0200842 A1 | 9/2006 | Chapman et al. | |
| 2007/0169148 A1 | 7/2007 | Oddo et al. | |
| 2008/0127275 A1 | 5/2008 | Tang et al. | |
| 2009/0042607 A1 | 2/2009 | Adachi et al. | |
| 2009/0199254 A1* | 8/2009 | White | H04N 7/163 725/110 |
| 2010/0169905 A1 | 7/2010 | Fukuchi et al. | |
| 2012/0030587 A1 | 2/2012 | Ketkar | |
| 2012/0047529 A1 | 2/2012 | Schultz et al. | |
| 2012/0210268 A1 | 8/2012 | Hilbrink et al. | |
| 2013/0006765 A1 | 1/2013 | Lee | |
| 2013/0041747 A1 | 2/2013 | Anderson et al. | |
| 2013/0332962 A1 | 12/2013 | Moritz | |
| 2014/0123178 A1 | 5/2014 | Burkitt et al. | |
| 2014/0223474 A1 | 8/2014 | Wang et al. | |
| 2014/0233474 A1 | 8/2014 | Wu et al. | |
| 2014/0282745 A1 | 9/2014 | Chipman et al. | |
| 2014/0325556 A1 | 10/2014 | Hoang et al. | |
| 2015/0082330 A1 | 3/2015 | Yun | |
| 2015/0234820 A1 | 8/2015 | Arvamudan | |
| 2016/0029054 A1 | 1/2016 | Waisanen et al. | |
| 2016/0212465 A1* | 7/2016 | Kim | H04N 21/25891 |
| 2016/0295280 A1* | 10/2016 | Zavesky | H04N 21/44218 |

OTHER PUBLICATIONS

Bostick et al., "Event Pop-Ups for Video Selection", U.S. Appl. No. 14/845,479, filed Sep. 4, 2015.

IBM; "Method and System for Mobile Viewing Preference Transport"; An IP.com Prior Art Database Technical Disclosure; Original Publication Date: Aug. 27, 2003; IP.com No. 000019047; IP.com Electronic Publication: Aug. 27, 2003; pp. 1-2.

IBM et al., "Personal Television Schedule Service", An IP.com Prior Art Database Technical Disclosure, Original Publication Date: Aug. 1, 1996, Original Disclosure Information: TDB v39 n8 Aug. 1996, pp. 7, pp. 237-244, IP.com No. 000118056, IP.com Electronic Publication: Mar. 31, 2005, vol. 39, No. 8, Aug. 1996.

Price, Mark, "Why personalization of your TV experience will be awesome", VentureBeat, Feb. 7, 2013, 12:00 PM, 9 pages, <http://venturebeat.conn/2013/02/07/why-personalized-tv-will-be-awesome/>.

Ribiere et al.; "Progressive display of user interests"; An IP.com Prior Art Database Technical Disclosure; Original Publication Date: Feb. 11, 2008; IP.com No. 000167391; IP.com Electronic Publication: Feb. 11, 2008; Copyright:© 2007 Motorola et al., Inc.; 6 pages.

Tobi Pro Global, "Advertising research and eye tracking"; Copyright © 2015, Tobii AB (publ); Printed on: May 28, 2015; pp. 1-5.

Warzel, Charlie, "BreakingNews Introduces Smart TV News Ticker", Adweek, Apr. 18, 2012, 12:23 PM, 3 pages, <http://www.adweek.com/news/technology/breakingnews-introduces-smart-tv-news-ticker-139672>.

"Azuki Systems is now part of Ericsson", provided in the main idea dated Feb. 21, 2015, 2 pages, <http://www.ericsson.com/ourportfolio/azuki-landingpage>.

"Building a Smart Online Video Application", Dr. Dobb's, Dec. 1, 1997, pp. 1-8, Copyright © 1997, Dr. Dobb's Journal, <http://www.drdobbs.com/web-developnnent/building-a-smart-online-video-application/184410343>.

"Scrolling News Crawl Software for TV Broadcast", TV-Ticker, © Worldflash Software, Inc. 1998-2010, Downloaded from TV-Ticker, Downloaded from the Internet on Mar. 2, 2015, 3 pages, <http://tvticker.worldflash.com/>.

"Technique for end to end personalized and interactive marketing on Television", An IP.com Prior Art Database Technical Disclosure, Authors et. al.: Disclosed Anonymously, IP.com No. 000236959, IP.com Electronic Publication: May 23, 2014, pp. 1-5.

List of IBM Patents or Patent Applications Treated as Related, Filed Jan. 6, 2017, 2 pages.

\* cited by examiner

EVENT POP-UPS FOR VIDEO SELECTION

BACKGROUND OF THE INVENTION

The present invention relates generally to the field of video distribution interfaces, and more particularly to display interfaces to facilitate video program or channel selection.

As more video content is produced, finding something that you will like becomes a chore. Originally, printed program guides attempted to solve this problem by listing the content of various broadcast channels that will be shown in the near future. More recently, program guides have become interactive providing a graphical user interface (GUI) for browsing. Additionally, interactive program guides also included what content or programs are currently being broadcasted. However, in both printed and interactive guides a user must actively find content within the guide to know what is being offered.

SUMMARY

Embodiments of the present invention provide a computer program product to notify a viewer of content relevant to the viewer's interests. A computer identifies an identity of a viewer of a display device, wherein the display device is displaying a first video feed. A computer determines a plurality of preferences of the viewer, wherein the plurality of preferences is based, at least in part, on the following: (i) a profile of the viewer on a social network; (ii) one or more messages posted by the viewer to the social network; (iii) a profile of a friend of the viewer on the social network; (iv) one or more messages posted by the friend to the social network; (v) one or more prior viewing habits of the viewer; and (vi) one or more prior responses to previous notifications. A computer retrieves a profile of the viewer, wherein the profile includes the plurality of preferences of the viewer. In response to a determination that a content of a second video feed that is available for viewing on the display device matches at least one of the plurality of preferences of the viewer, a computer generates a notification of the second video feed, wherein: (i) the content of the second video feed includes at least one of the following: (i) a genre of the second video; (ii) a game being played during the second video; (iii) an actor captured in the second video; or (iv) a sports team or player captured in the second video; (ii) the notification indicates an upcoming event in the content of the second video feed that matches at least one of the plurality of preferences of the viewer; and (iii) the notification includes the content of the second video feed that matches the at least one of the plurality of preferences of the viewer. In response to receiving an acceptance of the notification, a computer sends a command to the display device to display the second video feed.

DETAILED DESCRIPTION

Figure 1:
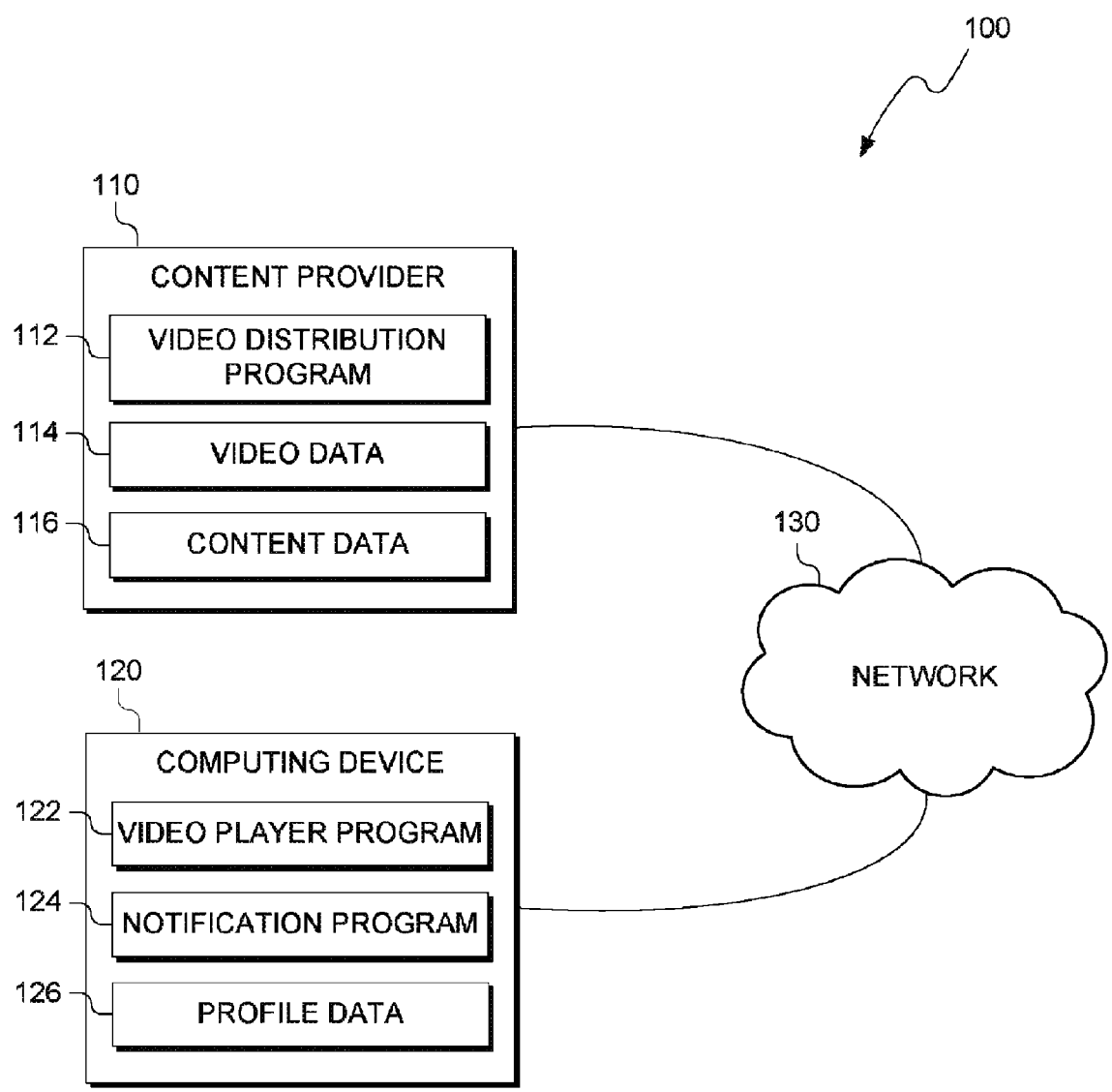
FIG. 1 is a functional block diagram illustrating a video distribution environment, in accordance with an exemplary embodiment of the present invention.

While solutions to presenting information regarding programming of a television broadcast system are known, they are passive and do not notify a user when relevant content becomes available on a stream or channel of the television broadcast system. Many set-top boxes include channel guides to present the content offered, however such solutions require a user to actively search for content they would like to view. Embodiments of the present invention recognize that by collecting information regarding a user, a profile can be generated to reflect the interests of the user. Additionally, information describing content provided by the television broadcast system can be determined. When a match between the broadcasted content and the preferences indicated by the profile of the user occurs, a notification message is displayed to the user. By notifying a user when content matching the user's preferences is currently or will be broadcasted, content matching the interests can be suggested to the user with minimal effort on part of the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating video distribution environment, generally designated 100, in accordance with one embodiment of the present invention. Video distribution environment 100 includes content provider 110 and computing device 120 connected over network 130. Content provider 110 includes video distribution program 112, video data 114 and content data 116. Computing device includes video player program 122, notification program 124 and profile data 126.

In various embodiments of the present invention, content provider 110 and computing device 120 are each a computing device that can be a standalone device, a server, a laptop computer, a tablet computer, a netbook computer, a personal computer (PC), or a desktop computer. In another embodiment, content provider 110 or computing device 120 each represent a computing system utilizing clustered computers and components to act as a single pool of seamless resources. In general, content provider 110 and computing device 120 can be any computing device or a combination of devices with access to video data 114, content data 116, and profile data 126 and is capable of executing video distribution program 112, video player program 122, and notification program 124. Content provider 110 and computing device 120 may each include internal and external hardware components, as depicted and described in further detail with respect to FIG. 5.

In this exemplary embodiment, video distribution program 112, video data 114 and content data 116 are stored on content provider 110. Video player program 122, notification program 124, and profile data 126 are stored on computing device 120. However, in other embodiments, video distribution program 112, video data 114, content data 116, video player program 122, notification program 124, and profile data 126 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between content provider 110 and computing device 120, in accordance with a desired embodiment of the present invention.

In various embodiments, content provider 110 includes video distribution program 112 that sends video data 114 to one or more users. Video data 114 includes one or more prerecorded videos, such as video-on-demand, or live feeds, such as broadcast channels. Computing device 120 includes video player program 122 that receives video data 114 for display to the user. In some embodiments, computing device 120 is a set-top box or other device connected to a display, such as a television. In other embodiments, computing device 120 includes a display, such as a smart television (TV) or smartphone. Video player program 122 receives input from a user of computing device 120 to view content of video data 114. For example, a user changes channels or selects a video offered by an on-demand service provided by content provider 110.

As an example scenario of video content distribution, content provider 110 is operated by a cable company offering a variety of channels (e.g., video data 114) to customers. The cable company distributes a feed of all the channels to the customers. The customers each have a set-top box (e.g., computing device 120) for viewing the channels offered by the cable company. The set-top box receives input from a user to select a channel for viewing. The set-top box filters the feed to select the desired channel and sends to a video signal of the channel to a connected television for display. In this example, video data 114 is broadcasted to computing device 120, with computing device 120 determining the content to display. In other scenarios, video data 114 may be selectively sent to computing device 120. For example, content provider 110 may be an internet protocol television (IPTV) provider or other server sending packets of information containing video data 114. One of ordinary skill in the art will appreciate that any system of content distribution may be used by a provider without deviating from the invention. Additionally, while not shown for simplicity, more than one content provider may be connected to network 130. Video player program 122 of computing device 120 is configured to receive the respective video data 114 of each content provider 110 as discussed herein. In some embodiments, content provider 110 acts as an intermediary for a content producer. For example, a broadcast television channel sends a live broadcast to content provider 110. Content provider 110 sends the broadcast to computing device 120. In such embodiments, content provider 110 may not store video data 114 and content data 116 locally and receive the data from a content producer for distribution.

In various embodiments, content provider 110 includes content data 116. Content data 116 describes the content of video data 114. For example, content data 116 includes the name of the actors in a movie offered in video data 114. Additionally, content data 116 may include events that occur in video data 114. For example, content data 116 includes a large battle event in a fantasy television series offered in video data 114. In various embodiments, content data 116 includes, but is not limited to, metadata describing the content; popularity metrics of the content; and event data of the content, such as the timing and types of events that occur during the content.

Example metadata may include actors in a movie or show; players or teams in a game; the genre of a movie or show; the type of sport being played; the number of an episode in a season (e.g., season premier or finale); and the time in a season of a game (e.g., opening game or playoffs). Example popularity metrics may include a number of users currently viewing or has viewed the content; a user rating of the content; and other editorial scores or reviews from external sources. Example event data may include events that occur during the content. For example, event data includes a fight in an action movie along with the combatants in the fight. As another example, event data includes an event for a home run and who hit the home run. Additionally, content data 116 may include the timing of said events in the content. For pre-recorded or delayed content, the timing of the events is included in content data 116. For example, the time the fight occurs in the playback of the action movie. For live or broadcast content, event data may be entered as a stream with the timing of the event set to when the event was entered in content data 116. One of ordinary skill in the art will appreciate that any information describing the content of a piece of video data 114 may be used without deviating from the invention. In some embodiments, by providing the events presented in the content of content provider 110, users can be notified by notification program 124 of relevant events when they will occur either in live content or pre-recorded content.

In some embodiments, a content producer or an administrator of content provider 110 provides content data 116 for content supplied to content provider 110. For example, the content producer provides metadata about a piece of pre-recorded content (e.g., actors, the characters the actors play and the genre of movie) in addition to events and timing of said events that take place in the content (e.g., a romantic moment occurs between a first character and second character at the thirty-five minute mark in a movie). For live content, a content producer or an administrator of content provider 110 provides content data 116 for events as they occur. For example, the current score is updated when a scoring event occur in a sports game. As another example, a player list is updated when a substitution occurs in a sports game. In some scenarios, content data 116 may be included in video data 114 (e.g., metadata is included in a video stream of video data 114). In some embodiments, notification program 124 retrieves content data 116 as the data becomes available. In an embodiment, notification program 124 retrieves a subset of content data 116. For example, notification program 124 receives preferences from a user, such as particular programs or channels the user wishes to be prompted with notifications. In response, notification program 124 retrieves only content data 116 that match the preferences of the user. As such, only approved notification types are displayed.

In other embodiments, video distribution program 112 analyzes content in video data 114 to determine content data 116. For example, video distribution program 112 performs facial recognition to determine actors in a movie or players in a game. Additionally, video distribution program 112 may perform event-based analysis of a video, which is a type of image analysis technique, to determine the events contained in said video. Such image analysis techniques are known to those of ordinary skill in the art. As such, further description of the particular functioning and execution of such techniques is not provided in this disclosure. For example, video distribution program 112 includes additional video content describing a plurality of reference videos of certain types of events (one clip for a first fight between two people and another clip for a dance routine between two people). Video distribution program 112 compares the reference videos to content in video data 114. When a match between a reference video and content in video data 114 is determined, video distribution program 112 generates content data using the description of the reference video as a template. Such as, if a dance routine is detected, video distribution program 112 creates a dance event and inserts the names of the actors, where the actors are determined based on the facial recognition discussed herein. By automatically determining events and descriptors of the events, such embodiments provide mechanisms for determining content that has yet to be identified manually. In another embodiment, video player program 122 determines events for one or more pieces of content in received video data 114. For example, video player program 122 receives input from a user to monitor a channel. While watching other content, video player program 122 automatically determines content for the monitored channel as similarly discussed with regards to video distribution program 112 performing event-based analysis to video content.

In various embodiments, computing device 120 includes notification program 124. Notification program 124 determines if relevant content is currently available in video data 114 by content provider 110. Notification program 124 retrieves content data 116. When content matches preferences or viewing habits for a user, notification program 124 displays a message to the user alerting the user to the availability of the content. For example, a broadcasted channel is currently playing a soccer game. The user has a preference to a particular player on a team playing in the match. Content data 116 indicates that during the live feed the soccer match the user's favorite player was just substituted onto the field. By comparing the preferences of the user and the content of the soccer game, notification program 124 displays a message indicating the player is now active in the game. The user can be watching other content on computing device 120 when this occurs (e.g., video player program 122 is displaying different video data 114 than the soccer match). In some scenarios, the message generated by notification program 124 includes a prompt to switch video player program 122 to view video data 114 of the soccer game. Notification program 124 receives confirmation from the user to change channels. In response, notification program 124 sends a command to video player program 122 to change channels (e.g., a stream of video data 114 currently playing the soccer match). In scenarios where timed events are present in a video or stream (e.g., a player substitution), notification program 124 sends a notification prior to the event occurring. In some scenarios, a live stream has a built in delay from the captured event occurring to when it is viewable. Notification program 124 sends the notification earlier than the delay of the stream to alert the viewer of the upcoming live event. In other scenarios, video player program 122 buffers or stores the incoming live stream when a notification is received. If a user accepts the notification, video player program 122 starts the video feed at the buffered point such that the viewer can see the live event described in the notification. In an embodiment, notification program 124 sends a notification to another device (not shown), such as a program installed on a smartphone of the user, alerting the user of the soccer match and the event matching the user's preferences.

In various embodiments, computing device 120 includes profile data 126. Profile data 126 includes one or more profiles of users of computing device 120. In some embodiments, when a user starts video player program 122 to watch video data 114 of a content provider 110, video player program 122 prompts the user to select the corresponding profile of the user. In other embodiments, computing device 120 provides authentication mechanisms to determine the user or users of computing device 120. For example, computing device 120 includes sensors to detect the identities of the users viewing the display of computing device 120. Computing device 120 includes a forward facing camera from the display. The camera records images of the users viewing the display. Notification program 124 determines the identities of the users by performing facial recognition on the images recorded by the camera, and comparing said images from the camera to images of the users stored in the relevant profiles of profile data 126.

In various embodiments, profile data 126 includes preferences of user of video player program 122. Preferences include information indicating preferred content the user wants to receive notifications from notification program 124 when relevant video data 114 is accessible by video player program 122 (e.g., video data 114 is retrievable from content provider 100 at the current viewing of other video content via video player program 122 by the user). Each profile includes preferences such as, but not limited to, preferred genres of movies or shows; preferred subjects or topics; preferred game types; preferred shows, networks, channels, or other types of content producers; preferred teams or players in a team; preferred hometown or location of teams; or preferred event types or situations (e.g., a fight scene or romantic moment in a movie). In some embodiments, a profile in profile data 126 includes the viewing habits of the user. Viewing habits includes information regarding the type of content for video data 114 the user often views, or other habits or interactions the user has when viewing content. Each profile includes viewing habits such as, but not limited to, the amount of time each type of content is previously viewed by a user (e.g., watches comedies more than dramas); frequency of content previously viewed (e.g., often watched shows or portions of shows, such as the opening theme song); or frequency of metadata in content previously viewed (e.g., favorite actor in shows watched).

In some embodiments, profile data 126 includes social network information regarding the user such as social networks the user belongs to and the profiles of other friends of the user within the social networks. Notification program 124 retrieves posts made by friends of the user to determine if the posts contain information regarding content offered in video data 114. For example, notification program 124 retrieves posts describing shows or games, or even actors or members of teams. As the frequency of posts including similar content increase (e.g., more posts describe a certain show), notification program 124 may include messages when the content becomes available in video data 114 (e.g., next time the show airs). In some embodiments, profile data 126 may include social network information to follow certain other users of the social network. A user may follower another member of the social network because both share similar interests or the other member is more knowledgeable about content provided by content provider 110. When a followed user posts information regarding content, notification program 124 provides messages to the user when the content mentioned by the followed user becomes available. In one embodiment, notification program 124 collects the preferences of a user, and other with similar interest, provides messages indicating when content of video data 114 is available that matches said preferences. As such, the user is more aware of content that is similar to the interests instead of manually discovering the content themselves.

In some embodiments, profile data 126 includes previous responses to notifications displayed by notification program 124. For example, if notification program 124 receives input from a user indicating the user would like to view the content associated with the notification, then notification program 124 stores in the profile of the user in profile data 126 information indicating the approval by the user (e.g., that the notification was relevant to the user's interests). If notification program 124 receives input from a user indicating the user would not like to view the content associated with the notification, then notification program 124 stores in the profile of the user in profile data 126 information indicating the disapproval by the user (e.g., the notification was not relevant to the user's interests). In some embodiments, by storing previous responses, notification program 124 trains the preferences of profile data 126, for a given user, to match the relevant interests of that user.

In an embodiment, profile data 126 includes user-designated preferences. For example, notification program 124 receives input from the user to provide notifications when certain content is present in video data 114, as discussed herein. A user can provide favorite actors or sports teams in profile data 126. A user may also provide disliked preferences and in response, notification program 124 does not generate notifications for video content containing the disliked preferences.

In various embodiments, notification program 124 determines the preferences, either liked or disliked, for each user based on one or more of: (i) the user's social network profile or profiles; (ii) profiles of users who are friends with or otherwise connected within the social network the user is a member of; (iii) viewing habits or past interactions with video player program 122; (iv) previous responses by the user to notifications generated by notification program 124; and (iv) user-designated preferences. In some embodiments, notification program 124 determines the preferences of a user. In other embodiments, notification program 124 receives the preferences from another program or module (not shown) connected to network 130.

Figure 2:
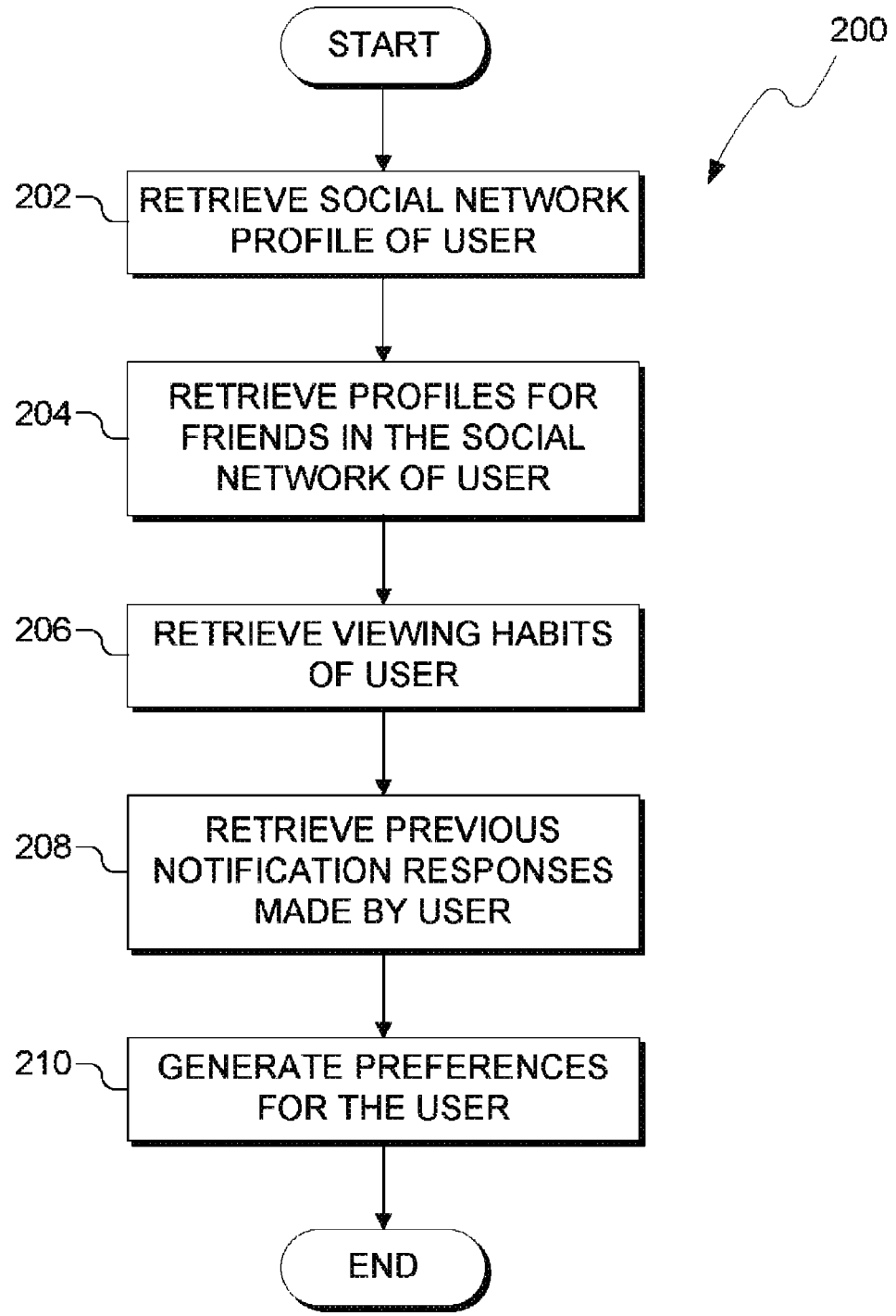
FIG. 2 illustrates operational processes of a notification program generating a preference profile, on a computing device within the environment of FIG. 1, in accordance with an exemplary embodiment of the present invention.

FIG. 2 illustrates operational processes, generally designated 200, of notification program 124 generating a preference profile. Notification program 124 generates preferences for profiles of users of computing device 120. The preferences for each profile indicate the type of content, and other factors a user associated with the profile, typically enjoyed for viewing by the user. In process 202, notification program 124 retrieves information from a social network profile from a social network platform (not shown). For example, notification program 124 retrieves one or more of the following from the social network: the user's age or birth date; the user's current home location; the user's birth location or previous places of residence; groups the user follows; and messages posted to the social network made by the user. In some scenarios, notification program 124 generates certain preferences based on the current location or previous locations the user lived. For example, notification program 124 creates a preference for a team located near the user's hometown. In other scenarios, notification program 124 generates certain preferences based on the user's posts or groups the user follows. For example, notification program 124 analyzes the content of the user's posts or descriptions of group the user follows to determine interests of the user. Notification program 124 generates preferences based on the determined interests.

In process 204, notification program 124 retrieves the social network profiles for friends of the user. Example information retrieved for each friend of the user in the social network includes, but is not limited to, one or more of the following: the friend's age or birth date; the friend's current home location; the friend's birth location or previous places of residence; groups the friend follows; and messages posted to the social network made by the friend. In some scenarios, notification program 124 aggregates the information gathered from each friend's profile to determine any trends or common interests among the friends of the user. For example, if a certain percentage of friends are currently living in a location, then notification program 124 determines the location is of interest to the user and generates preferences for video content about the area (e.g., news reports of the location or sports teams from the location). In other scenarios, notification program 124 generates certain preferences based on the posts made by friends of the user. Notification program 124 analyzes the content of the friends' posts to determine common topics among the various posts. If the number of posts from friends of a user about a topic exceed a threshold value or percentage, then notification program 124 generates preferences based on the topic. For example, if over three-fourths of the friends for a user post social network messages about a show, then notification program 124 generates a preference for the show for the user.

In process 206, notification program 124 retrieves the viewing habits of the user from profile data 126. As a user views video data 114 from content provider 110, notification program 124 stores respective content data 116 regarding the video data 114 when viewed by the user via video player program 122. In some scenarios, notification program 124 stores content data 116 in a user's profile describing the content of the video being displayed (e.g., metadata of the content such as, genre and actors in a movie or teams and game being played). In other scenarios, notification program 124 stores the length of time a respective video data 114 or type of content data 116 has been viewed by the user. For example, notification program 124 stores how long a particular piece of video content has been viewed. In another scenario, notification program 124 stores how long a type of content has been viewed by the user (e.g., a user has watched a cumulative of twenty hours of comedies or two hundred hours of movies with an particular actor). In some embodiments, notification program 124 represents viewing habits as a distribution of weights among one or more types of content data 116. For example, a user has one-hundred hours of time viewing various different videos via video player program 122 and twenty hours are spent watching sports games, thirty hours watching comedies, and fifty hours watching mysteries. Notification program 124 assigns respective weights of 20% to sports, 30% to comedies, and 50% to mysteries. In some embodiments, profile data 126 includes a record of all viewing habits of a user. In other embodiments, profile data 126 includes a pre-determined record of viewing habits of the user (e.g., the last three months of viewing habits).

In process 208, notification program 124 retrieves previous responses of the user to prior notifications displayed by notification program 124. When notification program 124 displays a notification to a user, notification program 124 stores the response from the user to the notification. Furthermore, notification program 124 stores the content data 116 of the respective video data 114 indicated in the notification. Notification program 124 stores an indication of whether the user accepts or rejects the notification. If a user accepts a notification to change the displayed video data 114, then notification program 124 stores the content data 116 of the suggested video data 114. If a user rejects a notification to change the displayed video data 114, then notification program 124 stores the content data 116 of the suggested video data 114 that was rejected. In some scenarios, accepted notifications increase a score associated with the preferences stored in profile data 126 for a user for the types of content data 116 of the suggested video data 114 that was accepted by the user. Rejected notifications decrease a score associated with the preferences stored in profile data 126 for a user for the types of content data 116 of the suggested video data 114 that was rejected by the user.

In process 210, notification program 124 updates preferences for the user viewing video data 114 on video player program 122. Notification program 124 retrieves social network information (process 202 and 204), viewing habits (process 206) and previous notification responses (process 208) to update preferences for a user. In some embodiments, notification program 124 performs processes 202, 204, 206 and 208 at certain intervals (e.g., daily) or events (e.g., when a user begins viewing video data 114). In other embodiments, notification program 124 performs processes 202, 204, 206 and 208 independently and at different times or events. For example, notification program 124 retrieves social network information (processes 202 and 204) when new information is available (e.g., a new message is posted by the user). In some embodiments, notification program 124 updates preferences for the user viewing video data 114 when new information is retrieved in one or more of processes 202, 204, 206 or 208. For example, new viewing habits have been stored in profile data 126, but social network information remains the same. In such embodiments, notification program 124 updates preferences for a user when relevant profile data 126 (e.g., the profile of the user) is updated. In various embodiments, profile data 126 includes preferences for a user. Preference indicate types of content, determined by notification program 124, that the user is predicted to enjoy. In some embodiments, preferences include a list of content the user would enjoy, such as favorite actors, teams, genres and the like. If video data 114 is currently available with one or more of the preferences of the user, then notification program 124 generates a notification indicating the availability for the particular video data 114. In other embodiments, preferences include a score for each type of content. In some scenarios, the higher the score indicates a higher preference by the user for that type of content.

Figure 3A:
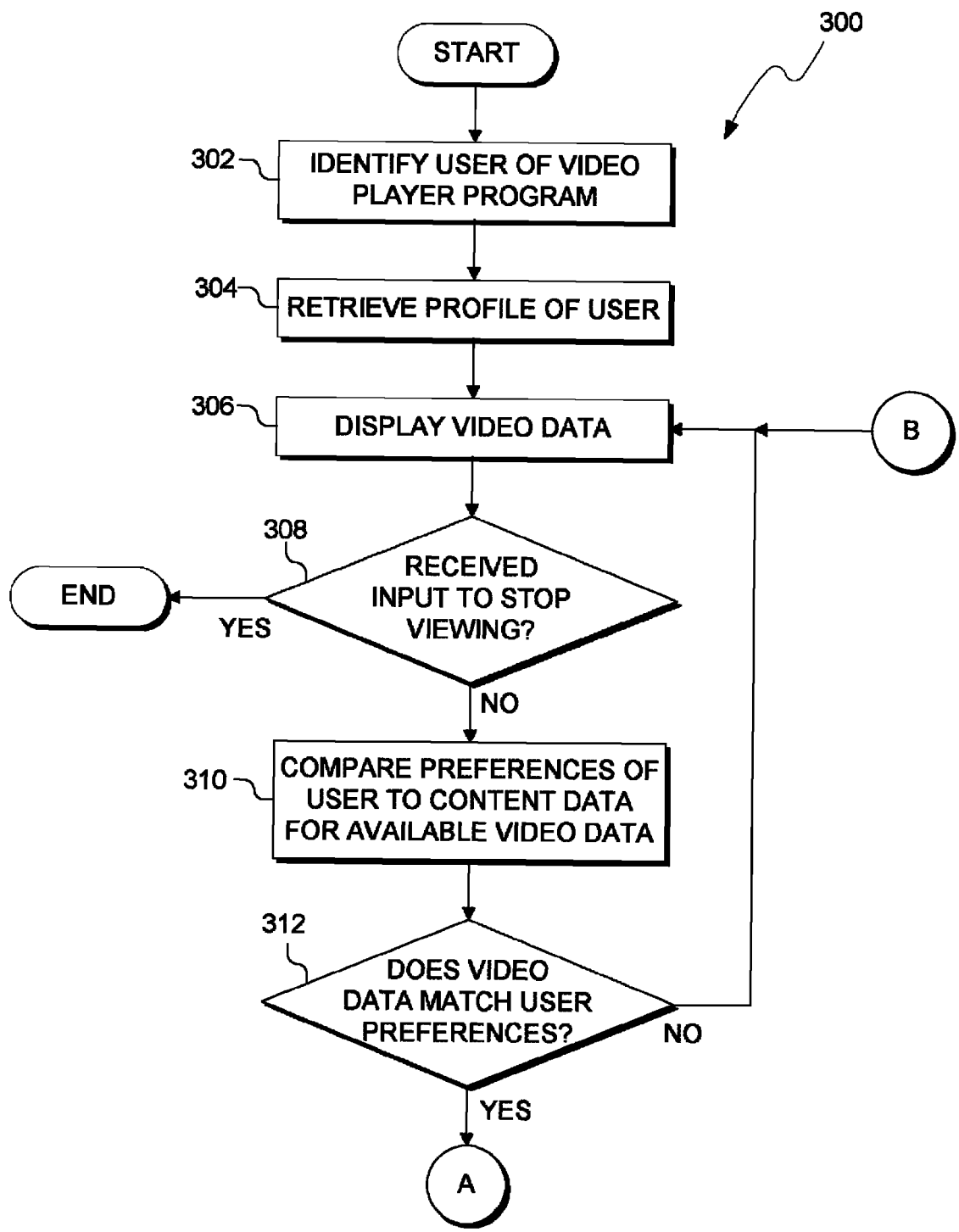
FIGS. 3A-3B illustrates operational processes of a notification program displaying notifications of content, on a computing device within the environment of FIG. 1, in accordance with an exemplary embodiment of the present invention.
Figure 3B:
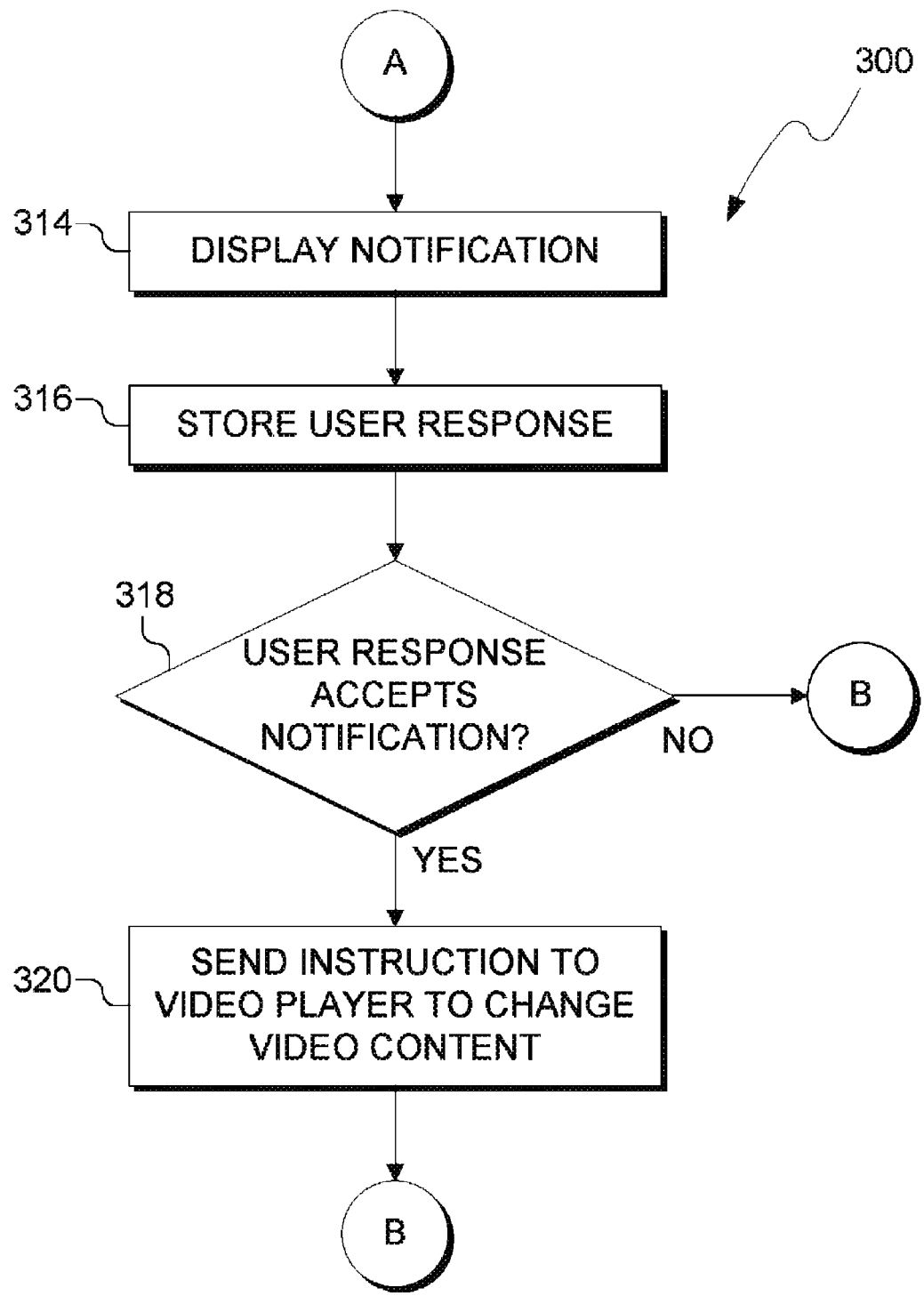

FIGS. 3A-3B illustrates operational processes, generally designated 300, of notification program 124 displaying notifications of content. In process 302, notification program 124 identifies the identity of the user of video player program 122. In some embodiments, video player program 122 receives authentication information (e.g., a username and password) to access video data 114. Notification program 124 receives the authentication information from video player program 122. Based on the authentication information, notification program 124 determines the respective profile in profile data 126. In other embodiments, computing device 120 includes one or more sensors for detecting the identity of the user. For example, computing device 120 includes a camera. Notification program 124 receives images of users of computing device 120. Profile data 126 includes a face image profile for each user. As such, notification program 124 compares received images from the camera to the images associated with each profile to identify the user of video player program 122. In an embodiment, notification program 124 identifies more than one user of video player program 122. For example, computing device 120 is a smart TV with a camera. Notification program 124 receives one or more images including all current users viewing the smart TV. For each users included in the one or more images, notification program 124 identifies the identities of each user.

In process 304, notification program 124 retrieves the profile of the identified user from profile data 126. In various embodiments, notification program 124 retrieves the viewing preferences of the user associated with the profile. In process 306, video player program 122 displays a video or stream from video data 114. As a user watches a video of stream on computing device 120, notification program 124 compares the retrieved viewing preferences of the user to content data 116 of other videos or streams currently available for viewing in video data 114 (process 310). While a user views a video or stream of video data 114, video player program 122 may receive a variety of commands from the user to control the video data 114 displayed by video player program 122. For example, computing device 120 is a smart TV. Video player program 122 receives an input command from the user to change the current stream of video data 114 to another stream (e.g., change channels). As another example, video player program 122 receives an input command from the user to change the current video (e.g., an on-demand video of content provider 110) of video data 114 to a live stream of video in video data 114. One of ordinary skill will appreciate that a notification displayed by notification program 124 can occur at any state or mode of operation of video player program 122.

In determination process 308, video player program 122 determines if a command is received to stop viewing of video data 114. If a stop command is received (YES branch of determination process 308), then video player program 122 stops the display of video data 114. If not stop command is received (NO branch of determination process 308), then video player program 122 continues operation awaiting either commands from the user (e.g., as discussed herein with regards to process 306) or from notification program 124 (e.g., as discussed herein with regards to process 320). In some embodiments, video player program 122 is currently not operating (e.g., is not currently displaying video data 114). In such embodiments, notification program 124 provides notifications to other devices (not shown) or programs (not shown) of computing device 120. For example, notification program 124 sends a notification to a smartphone via a text message when a notification of relevant content to the viewing preferences of the user is currently available in video data 114 of content provider 110.

In process 310, notification program 124 compares the viewing preferences of the user to content data 116 of available video data 114 of content provider 110. Viewing preferences include various topics, situations, or other descriptors that a user finds interesting. In some embodiments, notification program 124 determines viewing preferences of the users based on social network information, viewing habits, and previous responses to notifications generated by notification program 124. In other embodiments, notification program 124 receives user-designated preferences from the user. In various embodiments, notification program 124 determines if any the respective content data 116 of available video data 114 matches the viewing preferences of the user (determination process 312). If content data 116 of a video or stream of video data 114 matches one or more preferences of the user (YES branch of determination process 312), then notification program 124 displays a notification to the user (process 314). In no content data 116 of the available video data 114 matches the preferences of a user (NO branch of process determination 312), then video player program 122 continues displaying the selected video data 114 (process 306) and notification program 124 continues comparing content data 116 of available video data 114 until either a stop command is received (YES branch of determination process 308) or a notification is displayed (process 314).

In process 314, notification program 124 displays a notification to the user. The notification includes a message describing the content matching the user's preferences and, in some embodiments, other content data 116 of the matching video or stream of video data 114. For example, a user has a preference for 'Actor A'. Notification program 124 determines that a movie, titled 'Movie X', has become available for viewing on a 'Channel Y' with 'Actor A' in the cast. An example notification message states "'Actor A' is starring in 'Movie X' on 'Channel Y'". 'Actor A' is included due to the matching of viewing preferences. The other content data 116 is included to provide context for the notification. In some embodiments, the notification includes interface elements for accepting the notification. When a notification is accepted, notification program 124 sends an instruction to video player program 122 to change the displayed video data 114 to the video or stream indicated in the notification (process 320). The notification may also include an interface element for rejecting the notification. If the user selects the interface element for rejecting the notification, then notification program 124 does not send an instruction to video player program 122, with video player program 122 continuing to display the currently selected video or stream by the user.

In process 316, notification program 124 stores the response by the user to the interface elements for accepting or rejecting a notification in the profile of the user of profile data 126. By storing previous responses, notification program 122 trains the preferences of the user stored in profile data 126 to provide more relevant notifications to the user in the future. For example, a preference for a sports team is present in a profile of a user. At a later time, a game featuring the team becomes available for viewing in video data 114. Notification program 124 display a notification alerting the user of the availability of the game for viewing. The user selects the rejection interface element indicating they do not wish to view the game. Notification program 124 stores the response and adjusts the preferences of the user based on the response. In one scenario, the team is no longer consider a preference of the user after the rejection of the notification. In another scenario, more than one rejection is received before removing the preference for the team. Such scenarios may occur when more than one preference matches content data 116 of a video or stream. In an embodiment, notification program 124 stores a neutral response to a notification program. For example, the displayed notification may be displayed for only a few seconds. If the user does not respond within the time frame of display for the notification, then notification program 124 stores an indication that the response was neutral (neither accepting nor rejecting the notification).

In determination process 318, notification program 124 determines if the received response accepts the notification. If the received response accepts the notification (YES branch of determination process 318), then notification program 124 sends a command to video player program 122 to begin displaying the video or stream associated with the accepted notification (process 320). In response to the receiving the command, video player program 122 changes the displayed displays video or stream associated with the notification (process 306), until a new command is received from the user or a separate notification is accepted by the user for a different video or stream. If the received response rejects the notification (NO branch of determination process 318), then notification does not send a command to video player program 122, with video player program 122 continuing to display the currently viewed video or stream.

Figure 4:
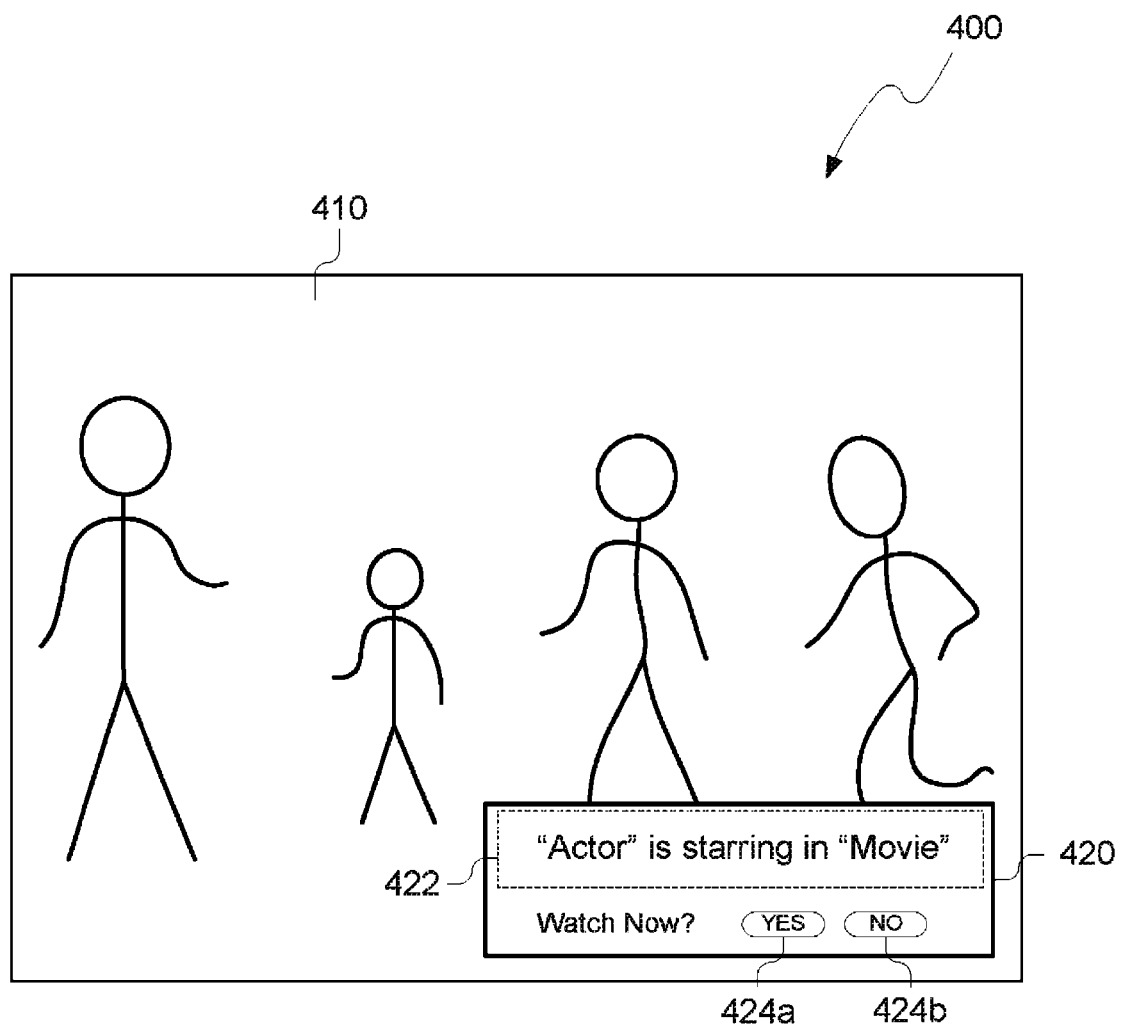
FIG. 4 depicts an example display of an overlay notification, in accordance with an exemplary embodiment of the present invention.

FIG. 4 depicts an example display, 400, of overlay notification 420. As a user selects and views videos or streams from video data 114 of content provider 110, video player program 122 displays the selected video or stream as video feed 410. During the course of viewing the selected video or stream, notification program 124 compares the preferences of the user to content data 116 corresponding to video data 114 that is not selected for display in video feed 410. For example, a user is viewing a live stream of video data 114 for a television channel on a smart TV. As such, notification program 124 compares content data 116 for video data 114 of other live streams of video provided by different channels of content provider 110.

In various embodiments, when notification program 124 determines that a match between the user's preferences and content data 116 of video or streams currently available but not being viewed in video feed 410 occurs, notification program 124 generates a notification indicating the available video or stream that matches the user's preferences. In some embodiments, notification program 124 displays the notification as overlay notification 420. Notification program 124 generates an interface element displayed over video feed 410. In other embodiments, notification program 124 sends an instruction or command to video player program 122 to display a notification. In another embodiment, notification program 124 sends an instruction or command to another device, such as a smartphone of the user, to display a notification.

In various embodiments, overlay notification 420 includes notification message 422, acceptance interface element 424a and rejection interface element 424b. Notification message 422 includes a description of content data 116 for a currently available video or stream notification program 124 suggests for viewing by the user. In some scenarios, the message includes portions of content data 116 of the suggested video or stream that matches the preferences of the user (e.g., the user prefers content with an actor, therefore the message includes the actor's name). In other scenarios, the message includes portions of content data 116 that did not match the preferences of the user but provide context (e.g., the movie the actor appears in is not a preference of the user, but provides context to the content being suggested). In various embodiments, overlay notification 420 includes acceptance interface element 424a and rejection interface element 424b to received input from the user regarding the user's acceptance or rejection of the notification. When acceptance interface element 424a is selected, notification program 124 sends a command to video player program 122 to change video feed 410 to the video data 114 associated with the notification. When acceptance interface element 424a is selected, the notification is dismissed and video player program 122 continues to display the current video feed 410.

Figure 5:
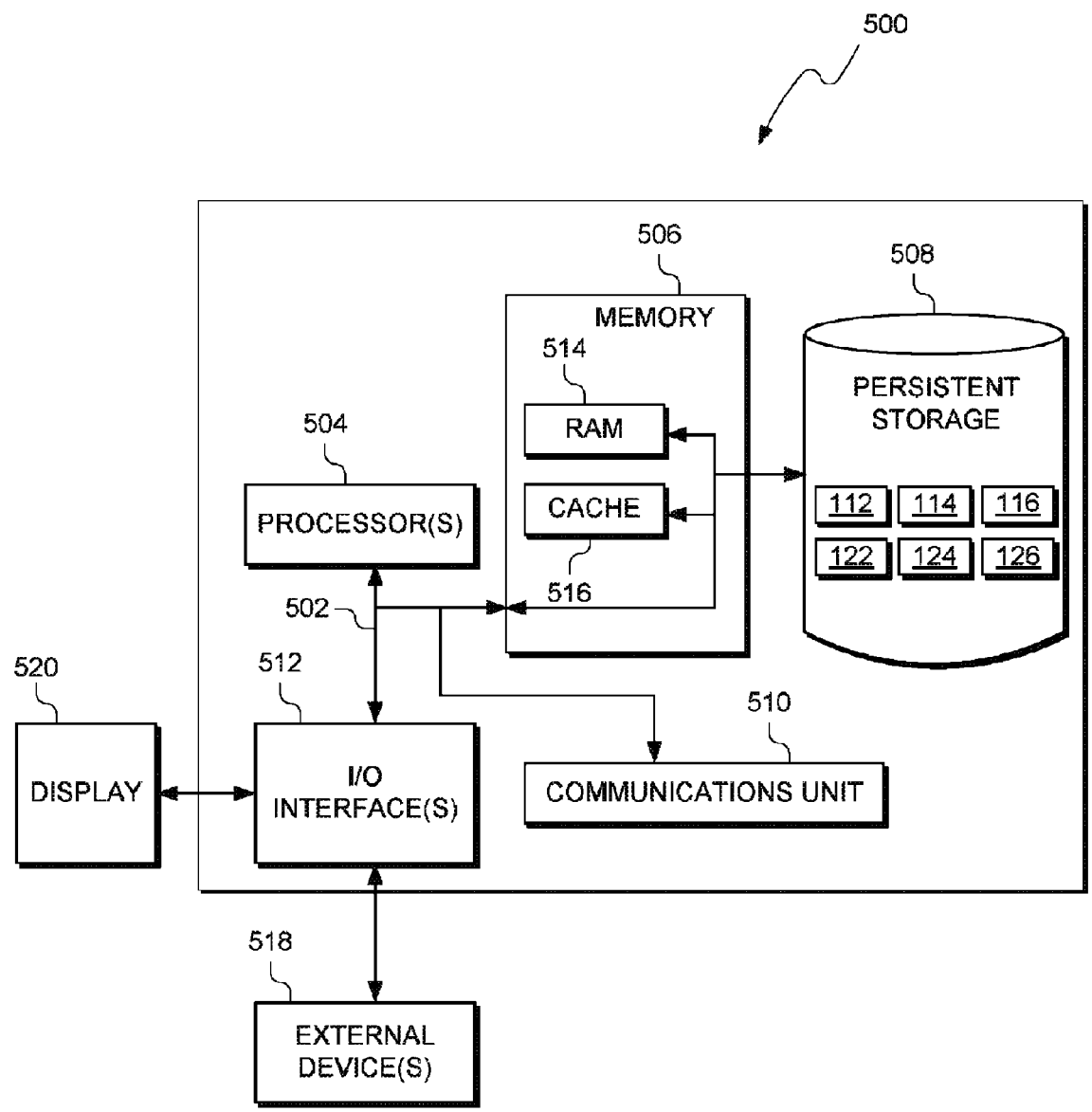
FIG. 5 depicts a block diagram of components of the computing device executing a video distribution program, a video player program, or a notification program, in accordance with an exemplary embodiment of the present invention.

FIG. 5 depicts a block diagram, 500, of components for each of content provider 110 and computing device 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Content provider 110 and computing device 120 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Video distribution program 112, video data 114, content data 116, video player program 122, notification program 124, and profile data 126 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards.

Communications unit 510 may provide communications through the use of either or both physical and wireless communications links. Video distribution program 112, video data 114, content data 116, video player program 122, notification program 124, and profile data 126 may be downloaded to persistent storage 508 through communications unit 510.

I/O interface(s) 512 allows for input and output of data with other devices that may be connected to one or both of content provider 110 or computing device 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., video distribution program 112, video data 114, content data 116, video player program 122, notification program 124, and profile data 126, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer program product comprising:
one or more computer-readable storage media and program instructions stored on the one or more computer-readable storage media, the program instructions comprising:
program instructions to receive an image of a viewer of a display device;
program instructions to identify an identity of the viewer of the display device based, at least in part, on the image of the viewer, wherein the display device is displaying a first video feed;
program instructions to determine a plurality of preferences of the viewer, wherein the plurality of preferences is based, at least in part, on the following: (i) a profile of the viewer on a social network; (ii) one or more messages posted by the viewer to the social network; (iii) a profile of a friend of the viewer on the social network; (iv) one or more messages posted by the friend to the social network; (v) one or more prior viewing habits of the viewer; and (vi) one or more prior responses to previous notifications;
program instructions to retrieve a profile of the viewer, wherein the profile includes the plurality of preferences of the viewer;
program instructions to determine a content of a second video feed based, at least in part, on at least one image of the second video feed;
in response to a determination that the content of the second video feed that is available for viewing on the display device matches at least one of the plurality of preferences of the viewer, program instructions to generate a notification of the second video feed, wherein: (i) the notification indicates an upcoming event in the content of the second video feed that matches at least one of the plurality of preferences of the viewer; and (ii) the notification includes the content of the second video feed that matches the at least one of the plurality of preferences of the viewer; and
in response to receiving an acceptance of the notification, program instructions to send a command to the display device to display the second video feed.

* * * * *